Dec. 11, 1973  G. W. FISHER ET AL  3,778,521
PROCESS FOR THE CONTINUOUS PRODUCTION OF BULGUR
Filed May 14, 1970  5 Sheets-Sheet 1

GLEN W. FISHER
DEWEY H. ROBBINS
VICTOR J. EVANS
GENE E. DAVIDSON
INVENTORS

ATTORNEYS

Dec. 11, 1973   G. W. FISHER ET AL   3,778,521
PROCESS FOR THE CONTINUOUS PRODUCTION OF BULGUR
Filed May 14, 1970   5 Sheets-Sheet 5

GLEN W. FISHER
DEWEY H. ROBBINS
VICTOR J. EVANS
GENE E. DAVIDSON

BY

*Seed, Berry & Dowrey*

ATTORNEYS

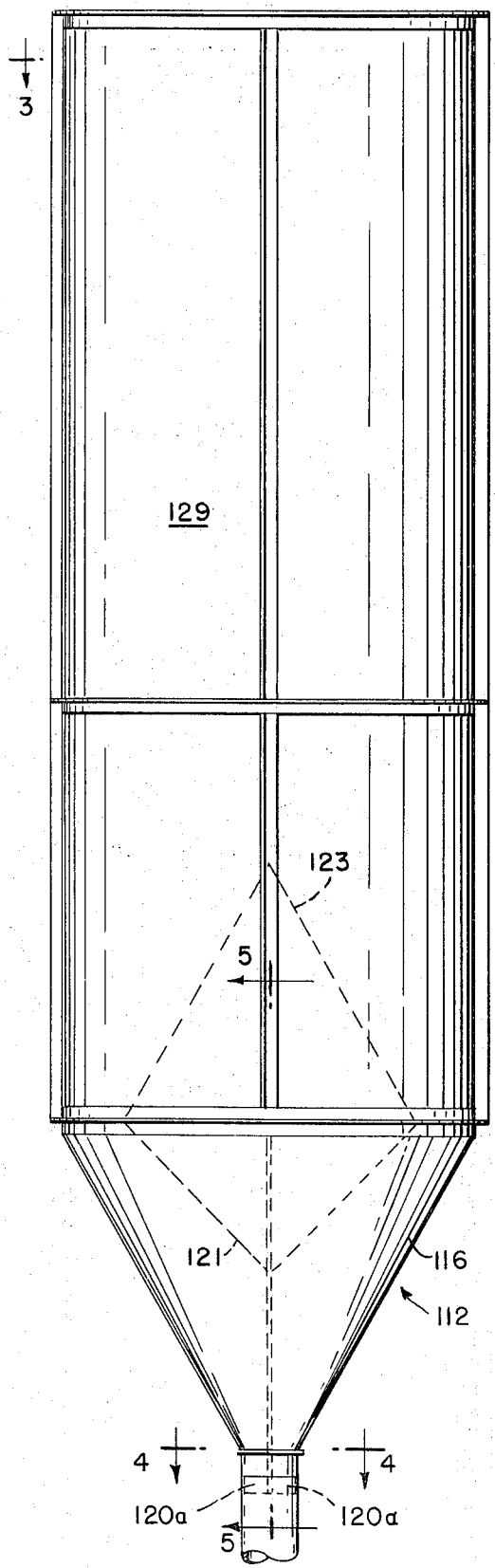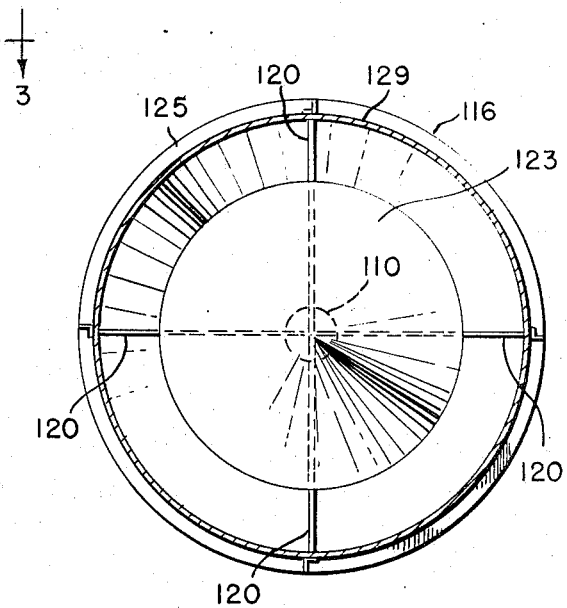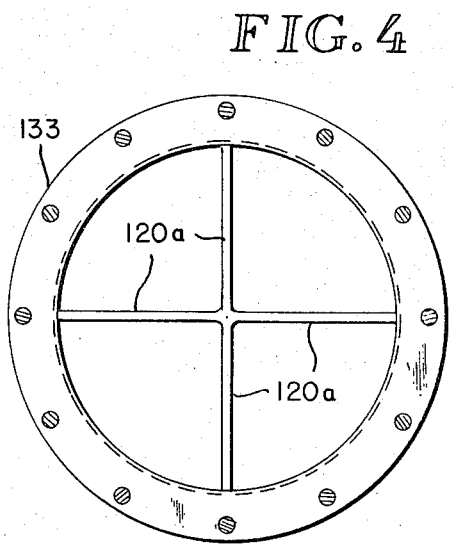
FIG. 2
FIG. 3
FIG. 4
INVENTORS
GLEN W. FISHER
DEWEY H. ROBBINS
VICTOR J. EVANS
GENE E. DAVIDSON
ATTORNEYS

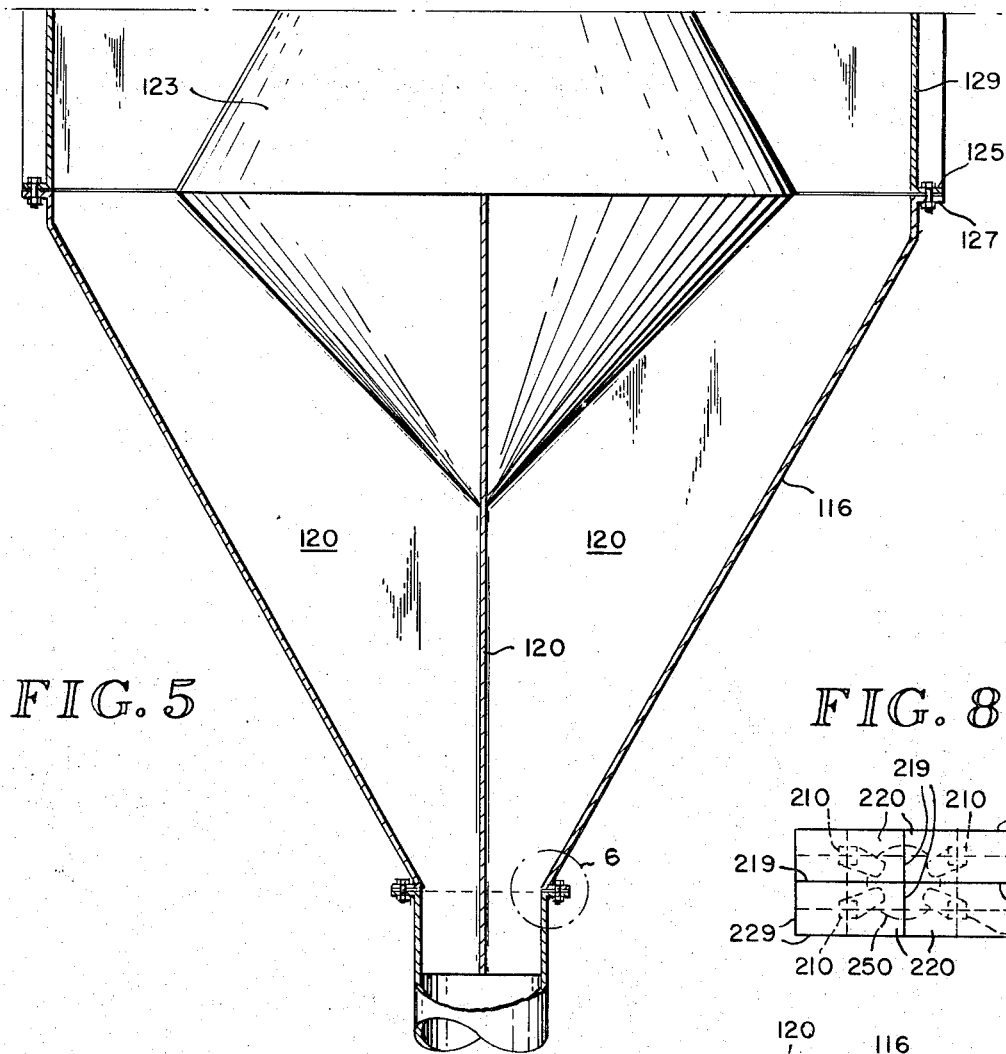
FIG. 5
FIG. 8
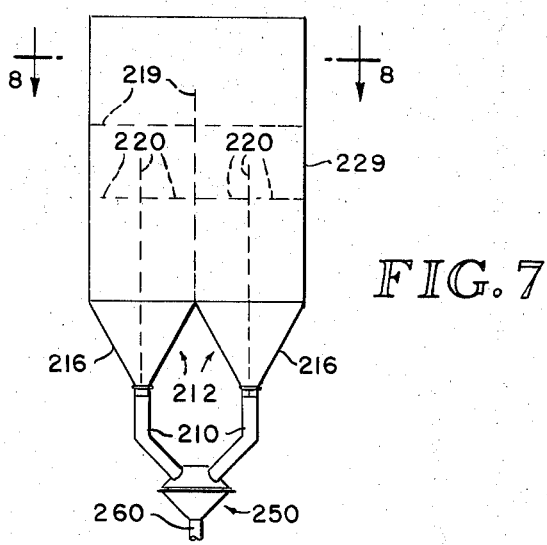
FIG. 7
FIG. 6
INVENTORS
GLEN W. FISHER
DEWEY H. ROBBINS
VICTOR J. EVANS
GENE E. DAVIDSON
BY *Seed, Berry & Dowrey*
ATTORNEYS

United States Patent Office 3,778,521
Patented Dec. 11, 1973

3,778,521
PROCESS FOR THE CONTINUOUS PRODUCTION OF BULGUR
Glen W. Fisher, Bellevue, and Dewey H. Robbins, Victor J. Evans, and Gene E. Davidson, Seattle, Wash., assignors to Fisher Flouring Mills Co., Seattle, Wash.
Continuation-in-part of abandoned application Ser. No. 806,890, Mar. 13, 1969. This application May 14, 1970, Ser. No. 37,097
Int. Cl. A23l *1/10*
U.S. Cl. 99—80 PS  21 Claims

ABSTRACT OF THE DISCLOSURE

A wheat gelatinization system is provided to produce bulgur on a continuous basis without grain steeping in a relatively short period of time and without employment of a separate cooking stage.

---

This application is a continuation-in-part of a copending United States application entitled, "System for the Continuous Production of Bulgur," Ser. No. 806,890, filed Mar. 13, 1969, now abandoned.

This invention relates to an improved system for the continuous production of bulgur.

Bulgur is a wheat product so processed that the starches in the wheat kernel or berry are completely gelatinized. To accomplish this gelatinization, the wheat berry must be hydrated to a water content of at least 40 wt. percent in a manner such that the added moisture completely and uniformly penetrates the entire berry to at least the 40% level, must then be heated to a temperature of at least 170° F. Following gelatinization, the product is dried and milled to the final form known as bulgur. The product is difficult to produce on a commercial basis because of the existence of a critical relationship between the moisture content and temperature of the wheat berry. If moisture is added too rapidly at too low a temperature, free moisture will surround the wheat berry and leach out starches, vitamins and minerals. Under more pronounced conditions, the presence of excess free moisture over prolonged periods will cause the wheat berry to lose its structural integrity, resulting in a "mush" that cannot be further processed to an acceptable end product. On the other hand, if the wheat berry temperature is raised too rapidly at too low a moisture level, the starches present in the wheat berry will be converted to dextrin rather than gelatinized, thereby rendering the product unacceptable.

Two "continuous," as opposed to "batch," processes heretofore have been employed to produce bulgur on a commercial basis. One process, commonly known as the "Albany" process and described in U.S. Patent No. 3,132,-948, is a continuous process wherein gelatinization is accomplished by conveying wheat under continuous water immersion conditions through a zone of progressively higher temperatures for a period sufficient to enable the wheat berry to absorb moisture to at least the 40% level, by conveying the moisture-containing wheat through a heated tempering zone for a period sufficient to enable the absorbed moisture to uniformly penetrate the wheat berry to at least the 40% level, and then by conveying the tempered wheat through an elevated temperature zone to steam-cook or gelatinize the starches. A second process, commonly known as the "Robbins" process and described in U.S. Patent No. 2,884,327, is a continuous process wherein gelatinization is accomplished by conveying wheat through a moisture and heat addition zone for a period sufficient to enable the wheat berry to absorb a predetermined level of moisture at a temperature below 170° F., and then into a settling zone wherein the wheat moves downwardly over a period sufficient to enable the absorbed moisture to uniformly penetrate the wheat berry, and then repeating these steps in further stages (all at temperatures below 170° F.) until about a 35% moisture level has been uniformly attained, then hydrating the moisture-laden wheat at the end of the last stage at an elevated temperature above 170° F., for a short period of time until the requisite 40% moisture level has been uniformly attained, and then steam-cooking the wheat to gelatinize the starches.

Although the Albany process is a relatively rapid process (the total gelatinization processing period taught by the patent being on the order of about two hours), it requires a large expenditure of energy to heat the excess water circulated through the immersion zone, and to separately cook the wheat in a final stage. Furthermore, the process requires an additional substantial expenditure of energy to mechanically convey the wheat through all stages of the process. Still further, the presence of such large volumes of excess water causes a severe leaching of the wheat vitamin and mineral content. The excess water also causes loss of other wheat constituents such that the overall recovery from the process, on a weight basis, is only about 85% of the amount entering the process. Therefore, the relatively high volume output achieved by this process is only attainable at greater cost for heating and conveying equipment and only with the production of a somewhat inferior product.

On the other hand, although the Robbins process is a relatively slow process (the total gelatinization processing period taught by the patent being on the order of about twelve hours), it requires a relatively low expenditure of energy to heat and convey the wheat and the product vitamin and mineral content and recovery percentage are high. However, the process requires a substantial expenditure in capital equipment to achieve a high volume output comparable to the output of the Albany process. Prior attempts to reduce the overall time period of the Robbins process have been only partially successful. These attempts have centered on reducing the time that the wheat spends in the settling zones. Such attempts established, however, that any significant reduction in the settling zone time periods resulted in the production of significant percentages of ungelatinized wheat—even with the employment of increased pressure-cooking time periods.

A primary object of the present invention is to provide a system for gelatinizing wheat on a continuous basis in a manner similar to the Robbins process but in a substantially shorter time period. Another object is to provide such a system wherein a separate cooking stage is not required. These and other objects and advantages of the present invention will become apparent from consideration of the following description in conjunction with the accompanying drawings, of which:

FIG. 2 is a side elevational view of a cylindrical penetration bin with discharge control means incorporated within the bin bottom;

FIG. 3 is a top plan view taken along the line 3—3 of FIG. 2;

FIG. 4 is a cross sectional view taken along line 4—4 of FIG. 2;

FIG. 5 is a vertical cross section taken along the line 5—5 of FIG. 2;

FIG. 6 is an enlarged detail of the encircled section of FIG. 5;

FIG. 7 is a side elevational view of a rectangular penetration bin with discharge control means incorporated both within and without the bin; and FIG. 8 is a top plan view taken along the line 8—8 of FIG. 7.

Figure 1A:
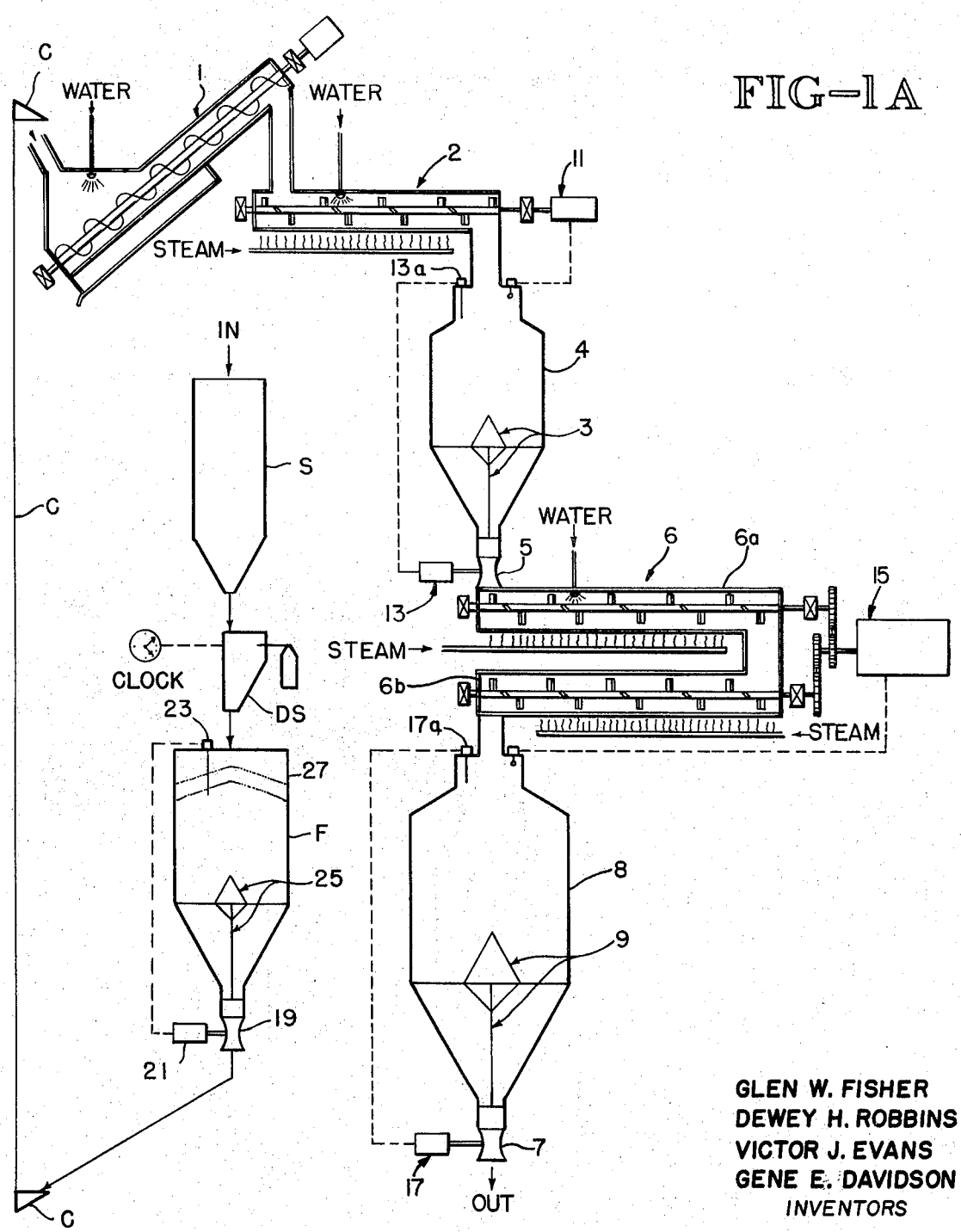
FIG. 1a is a schematic flow diagram of a two-stage embodiment of the process of this invention.

It has recently been discovered that a body of solid particulate material, such as cereal grains, does not move uniformly down through a vertical storage bin. Rather, those portions of the body vertically above the bin outlet, or outlets, will be funnelled downwardly and discharged ahead of the remainder of the body. This fact can be easily demonstrated by placing a plurality of numbered balls across the leveled top of a grain body filling a storage bin and then timing the balls' discharge. Whereas it would be expected that all of the balls would be discharged at substantially the same predictable time, it has been shown that there is an extremely large deviation from the expected, with those balls directly overhead of the bin outlet or outlets being discharged significantly earlier than expected.

This discovery led to the further discovery that this phenomenon occurs in the settling zones of the Robbins process. This funneling effect has been discovered to be so significant in the Robbins process in terms of the relative percentages of wheat involved that the minimum acceptable time period for wheat traversal of a Robbins process settling zone empirically becomes the time period required to enable the previously-added moisture to uniformly penetrate the wheat berry of the funneling portions of the wheat body before those portions are discharged under substantially last in-first out flow conditions. Therefore, the discharge flow rate must be curtailed to prevent premature discharge, thereby markedly increasing the average residence time period within the settling zone.

This situation results in substantial portions of the wheat body remaining in the settling zone for significantly longer periods than is required to achieve uniform moisture penetration. Consequently, the amount of moisture and heat added prior to each settling zone must be carefully controlled to prevent excessive moisture and temperature conditions so that the wheat berries of these slower-moving portions of the wheat body will neither lose their physical integrity nor become dextrinized.

We have discovered that by appropriate design of the discharge outlet or outlets from a vertical storage bin, a moistened wheat body can be caused to uniformly traverse the bin and discharge therefrom in a last-in-last out manner. Upon achieving this result, we have further discovered that the bin residence time can be significantly shortened and still enable moisture to uniformly penetrate the wheat berries traversing the bin. Still further, we have discovered that moisture and heat can be added to the wheat body to a significantly greater extent than in the Robbins process without subsequently resulting either in loss of wheat berry structural integrity or in wheat berry dextrinization as the wheat body traverses the bins. In fact, moisture and heat can be added to such an extent that complete gelatinization occurs in the bins, thereby eliminating the requirement of the final cooking stage required by both the Albany and Robbins processes.

In brief, the process of the present invention comprises firstly the stage of simultaneously adding water and heat to a continuously advancing body of wheat until a predetermined wheat moisture level and temperature level is attained and tempering the moisture-containing wheat body at that temperature for a period sufficient to enable the added moisture to uniformly and completely penetrate the wheat berry. Grain moisture and temperature are raised most economically by mechanically conveying the wheat body through a zone in which hot water and atmospheric pressure steam are sprayed. The tempering period is provided most economically by a vertical bin through which the wheat body is caused to uniformly flow from an upper inlet to a lower outlet at a rate sufficient to ensure that complete moisture penetration occurs by the time wheat discharges from the bin. During the heat and moisture addition portion of this first stage, grain moisture and temperature are raised to levels as high as reasonably practical. Empirical tests have established that a grain moisture level of about 20%-35% can be obtained with a grain temperature level of about 160° F.–205° F. Significantly higher levels cannot be attained without product quality deterioration. For example, at grain moisture levels above about 35%, free water will occur within the penetration bin and cause starch leaching. Significantly lower levels cannot be attained without disrupting subsequent stages of the process.

In the second stage of the process, water and heat are again simultaneously added to the continuously advancing body of wheat until a second predetermined wheat moisture level and temperature level are attained, and the wheat body is again tempered for a period sufficient to enable the further added moisture to uniformly penetrate the wheat berry. Grain moisture and temperature are raised most economically by mechanically conveying the wheat body through a zone in which hot water and atmospheric pressure steam are sprayed in a manner such that no grain immersion occurs; and the penetration period is provided most economically by a vertical bin through which the wheat body is caused to flow uniformly at a rate sufficient to ensure that complete moisture penetration occurs by the time wheat discharges from the bin. Also, as in the first stage, grain moisture and temperature are raised to levels as high as reasonably practical during the heat and moisture addition portion of the second stage. Empirical tests have established that a grain moisture level of about 30%–45% can be attained with a grain temperature level of about 185° F.–210° F., provided that the parameters of the first step have been met. Significantly higher levels cannot be attained without product deterioration inasmuch as free water will occur in the bin at grain moisture levels above about 45% and cause starch leaching and significantly lower levels cannot be attained without disrupting subsequent stages of the process.

In the first stage, a grain moisture level of 25%–30% and a grain temperature level of 170° F.–200° F., are preferred; and in the second stage, a grain moisture level of 35—42% and a grain temperature level of about 195° F.–210° F., are preferred. Under the higher of these optimum conditions, two stages will complete the process. Under the lower of these optimum conditions, a third stage of the process is necessary and would comprise simultaneous water and heat addition to the continuously advancing wheat body and is again tempered for a period of time sufficient to enable the still further added moisture to uniformly penetrate the wheat berry.

In a third stage, as in the second stage, grain moisture and temperature are raised most economically by mechanically conveying the wheat body through a zone in which hot water and atmospheric pressure steam are sprayed in a manner such that no grain immersion occurs; and the penetration period is provided most economically by a vertical bin through which the wheat body is caused to uniformly flow at a rate sufficient to ensure that complete moisture penetration occurs by the time wheat discharges from the bin. A grain moisture level of about 40%–45% is attained with a grain temperature level of about 204° F.–210° F., respectively. Higher levels are not required and lower levels would needlessly require a fourth stage of heat and mositure addition followed by a peneration period.

At the end of the second or third stage, depending on the input parameters to the first two stages, the wheat body will be completely gelatinized and the only further processing required will be drying the gelatinized wheat to a moisture content of 11% or less and then milling the wheat to produce the finished bulgur product.

If the grain temperature of the wheat body entering the first penetration bin is at least 170° F., gelatinization will begin within the first bin, progress substantially within the second penetration bin, and be completed within the third penetration bin. If the grain moisture level entering the second bin is at least 40%, gelatinization will be completed within the second bin, thereby eliminating the necessity of the third stage in the process.

Wheat enters the system at a normal moisture content of 8%–16%. If the field moisture content of the wheat is too low, the wheat is desirably pre-tempered. Also, the wheat may be washed to enhance uniform moisture addition to the wheat and to augment moisture addition in the first stage.

A two stage process, employing two penetration bins, is shown in FIG. 1a. The wheat enters the system through a washer 1 from which the wheat is conveyed by a screw conveyor and discharged into a first paddle-type conveyor 2. As the wheat body is conveyed through conveyor 2, hot water and atmospheric pressure steam are sprayed into the conveyed wheat and intimately admixed therewith. In a typical installation, the conveyor 2 is about 10 feet long and its traverse period is about one minute. The wheat from the discharge end of the conveyor 2 is directed into the top of a first penetration bin 4 with a moisture content of 30% (primarily surface moisture) and a temperature of 195° F.–200° F. The wheat is caused to flow uniformly down through the bin 4 and is discharged therefrom into a second paddle-type conveyor 6. In a typical installation, the wheat traverses the bin 4 about 55 minutes and is discharged at a temperature of 195° F.–200° F. and with a moisture content of 30% uniformly dispersed throughout the wheat berry. Hot water and steam are sprayed into the wheat carried by the second conveyor 6 and discharged into the top of a second penetration bin 8 with a moisture content of 42% (12% of which is primarily surface moisture added in conveyor 6) and a temperature of 205° F.–210° F. The wheat is caused to flow uniformly down through bin 8 and is discharged therefrom in about 2 hours 5 minutes at a temperature of 205° F.–210° F., and with a moisture content of 42% uniformly dispersed throughout the wheat berry.

The water added in conveyors 2 and 6 is as hot as possible, typically 200° F. The steam added in conveyors 2 and 6 is at atmospheric pressure and 212° F. The penetration bins 4 and 8 are thermally insulated to retain the heat added in the preceding conveyors. Water and heat are added to the wheat in the conveyors as rapidly as the wheat can absorb them, with progressively more water added toward the discharge end of the conveyors where the grain temperatures are highest. The conveyor bottoms may be foraminous to enable steam to pass upwardly through the moving wheat body and also to enable any excess moisture to drain away so that no grain immersion occurs. The lengths of the conveyors and their traverse times must be sufficient not only to carry the wheat to the inlets but also to permit uniform dispersion of heat and moisture to the conveyed wheat body.

In the process arrangement of FIG. 1a, the two penetration bins 4 and 8 may be arranged vertically thereby permitting the use of paddle-type conveyors as opposed to screw-type conveyors. The respective paddle-type conveyors 2 and 6 (the latter constituting two sections 6a and 6b) are arranged horizontally to minimize power requirements on the conveyors and to maximize thorough admixture of water and steam with the wheat body traversing the conveyors. By arranging the intermediate conveyor 6 in two sections, the necessary conveyor length for proper water and steam addition may be provided in a relatively small vertical spacing.

A critical feature of the process is that the wheat must advance uniformly through the penetration bins inasmuch as the bins are designed to empty over a period empirically determined to be necessary to achieve uniform moisture penetration of the wheat berry under last in-last out flow conditions. Wheat that traverses the bin too rapidly will not have a uniformly-penetrated moisture content. The outlet from each bin is provided with a means, 3 and 9, respectively, which controls the wheat discharge from the respective bin so as to cause uniform wheat advancement through each bin in a last in-last out manner.

In the two stage embodiment shown in FIG. 1a, it has been empirically determined that the volumetric ratio between the first and second penetration bins should be about 1:3 and that the respective bin designs should be such that about 30% of the total bin penetration period will occur in the first penetration bin and the remaining 70% of the penetration period will take place in the second penetration bin.

Figure 1B:
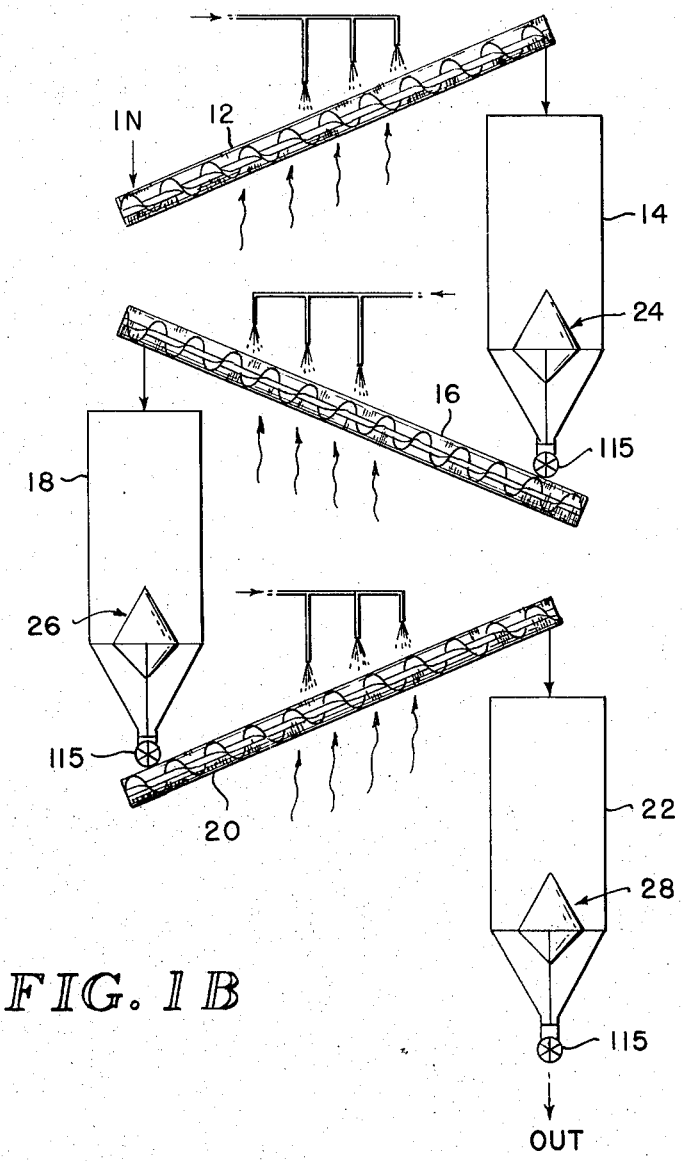
FIG. 1b is a schematic flow diagram of a three-stage embodiment of the process of this invention.

A three stage process, employing three penetration bins, is shown in FIG. 1b. The wheat after any pre-tempering or washing, is conveyed through a first screw-type conveyor 12 wherein hot water and atmospheric pressure steam are sprayed into the conveyed wheat. In a typical installation, the conveyor 12 is about twenty feet long and its traverse period is about one to two minutes. Wheat from the discharge end of the conveyor 12 is directed into the top of a first penetration bin 14 with a moisture content of 25% (primarily surface moisture) and a temperature of 190° F. The wheat is caused to flow uniformly down through the bin 14 and is discharged therefrom into a second screw-type conveyor 16. In a typical installation, the wheat traverses the bin 14 in about 65 minutes and is discharged at a temperature of 190° F., and with a moisture content of 25% uniformly dispersed throughout the wheat berry. Hot water and steam are sprayed into the wheat carried by the second conveyor 16 and discharged into the top of a second penetration bin 18 with a moisture content of 35% (10% of which is primarily surface moisture added in conveyor 16) and a temperature of 200° F. In a typical installation, the conveyor 16 is about twenty feet long and its traverse period is about one to two minutes. The wheat is caused to flow uniformly down through bin 18 and is discharged therefrom into a third screw-type conveyor 20. In a typical installation, the wheat traverses the bin 18 in about fifty-five minutes and is discharged at a temperature of 200° F., and with a moisture content of 35% uniformly dispersed throughout the wheat berry. Hot water and steam are sprayed into the wheat carried by the third conveyor 20 and discharged into the top of a third penetration bin 22 with a moisture content of 42% (7% of which is primarily surface moisture added in conveyor 20) and a temperature of 207° F. In a typical installation, the conveyor 20 is about twenty feet long and its traverse period is about one to two minutes. The wheat is caused to flow uniformly down through the bin 22 and is discharged therefrom at a temperature of 207° F., and with a moisture content of 42% sufficiently dispersed throughout the wheat berry. In a typical installation, the wheat traverses the bin 22 in about fifty minutes.

The water added in conveyors 12, 16 and 20 is as hot as possible, typically 200° F. The steam added in conveyors 12, 16 and 20 is at atmospheric pressure and 212° F. The penetration bins 14, 18 and 22 are thermally insulated to retain the heat added to the wheat in the preceding conveyors. Water and heat are added to the wheat in the conveyors as rapidly as the wheat can absorb them, with progressively more water added toward the discharge ends of the conveyors where the grain temperatures are highest. The conveyor bottoms may be foraminous to enable steam to pass upwardly through the moving wheat body and also to enable any excess moisture to drain away so that no grain immersion occurs. The length of the conveyors and their traverse times are not critical to the process inasmuch as they are primarily dictated by the physical requirements of carrying the wheat to the inlets of the respective penetration bins and not by the wheat temperature and moisture content requirements of the process.

A critical feature of the process is that the wheat must advance uniformly through the penetration bins inasmuch as the bins are designed to empty over a period empirically determined to be necessary to achieve uniform moisture penetration of the wheat berry under last in-last out flow conditions. Wheat that traverses a bin too rapidly will not have a uniformly-penetrated moisture content. The outlet from each bin is provided with a means 24, 26 and 28, respectively, which controls the wheat discharge from the respective bin so as to cause uniform wheat advancement through each bin in a last in-last out manner.

FIGS. 2-8 depict a preferred structure of the wheat discharge control means to be employed in the bottom of each penetration bin. This structure comprises discharge means 110, blender means 112, inlet means 114, and means restricting the discharge flow rate of the discharge means 110. The discharge means comprises a cylindrical discharge tube that constitutes the single bin outlet. The blender means comprises an outer shell or peripheral side wall 116 that constitutes the bin bottom wall, and a plurality (four) of divider plates or walls 120. The inlet means comprises a double apex cone assembly providing a first cone 121 with a downwardly-pointing apex, the cone bases having identical diameters and being joined together at their peripheries. The flow rate restricting means may comprise an adjustable pinch valve 5 as shown in FIG. 1a or a rotary screw feeder 115 discharging into the succeeding conveyor.

The side wall 116 of blender means 112 has a frusto-conical geometry with a slope angle steeper than the angle of repose of the wheat to be stored in the bin, and an external upper annular rim 125 bolted to a corresponding rim 127 on the base of the main bin cylinder 129, and an external lower annular rim 131 bolted to a corresponding rim 133 on the upper end of the discharge tube.

Each divider plate 120 has a vertical rectangular leg 120a depending from a main section, the outer edge of which abuts the inner surface of the discharge tube 110. Each plate main section has an inclined outer edge abutting the outer surface of cone 121, and an upper edge flush with the bottom edge of the bin cylinder 129 and with the bases of cones 121 and 123. The vertical edges of the divider plates 120 are welded together with weld bead material therebetween providing a rounded corner to minimize jamming of wheat at the corners. The outer surface of the lower cone 121 has a slope angle only slightly steeper than the angle of repose of the wheat and therefore segregated compartments defined by the divider plates have throats of increasing vertical dimension but of decreasing cross section down to the apex of the lower cone 121. The outer surface of the upper cone 123 has a slope angle steeper than the angle of repose of the wheat.

With four divider plates positioned equi-distant from one another, the opening into the segregated compartments of the bin bottom at the lower end of the bin cylinder 129 is sub-divided into four quadra-annular sections, one for each compartment (see FIG. 3). Consequently, wheat in the bin overhead will be directed by the surface of the upper cone 123 in equal amounts into the segregated compartments and from them into the discharge passageway inlet section wherein the streams are recombined. This stream division and recombination within the bin bottom causes uniform withdrawal from the bin, in contrast to the nonuniform withdrawal experienced by other single outlet bin bottom designs.

Where larger bin designs are required, the multiple bin outlet internal structure depicted in FIGS. 7 and 8 is designed to discharge wheat in four streams. This embodiment comprises four discharge means 210 and blender means 212. Each discharge means comprises a discharge tube that constitutes one of four equi-spaced bin outlets. The blender means comprises four conical shells or walls 216 of rectangular cross section, four main bin divider plates or walls 219 and sixteen bin bottom divider plates or walls 220. The main bin divider plates extend from the base of the vertical bin walls 220 upward into the bin to subdivide the bin into four main zones of equal rectangular cross section. The bin bottom divider plates extend from the bin base into the respective bin bottom cone to subdivide each bin bottom into four segregated compartments of equal rectangular cross section. The bin bottom divider plates are provided with vertical rectangular legs depending from a main section, the outer edges of which abut the inner surface of the discharge tube 210. Each plate main section has an outer edge abutting the inner surface of the respective wall 216. The upper ends of the bin bottom divider plates may be extended upwardly into the bin to brace both the walls 229 and the bin divider plates 219. If desired, the four bin outlet streams in discharge tubes 210 may be recombined by an external discharge control means 250 into a single stream 260, the means 250 in this case providing discharge flow rate restricting means (not shown) would be provided for blender 250.

The flow rate through the discharge passageway must be less than the combined flow capacity into the segregated compartments. Thus, under normal circumstances, the limitating flow rate through the discharge passageway will cause the segregated compartments of the blending means to be continuously full. Under operating conditions that keep the compartments filled, it has been discovered that particles in a cross sectional layer across the vertical discharge passageway will flow uniformly downward therethrough (under influence of gravity) regardless of the parameters existing upstream of the discharge passageway, provided that the discharge passageway is at least a certain length. This being the case, material can only be fed into the blending means at the rate at which it flows through the discharge passageway. Thus, any tendency of one portion of the wheat body within a bin to feed more rapidly than another, for example, is eliminated.

The length of the discharge passageway is critical to the extent that for any given discharge passageway and its cross sectional area, there will exist a point above the outlet thereto where the particles across the passageway will not fall uniformly downward. Therefore, the passageway must be sufficiently long that the distance from the passageway outlet to the segregated compartment outlets will be greater than the distance from the passageway outlet to that point of non-uniform flow. If this condition is met, the particles will descend from the segregated compartment outlets uniformly thereby forming a blend equal to the relative cross sectional areas of the segregated compartment outlets.

It is to be emphasized that the mechanism by which the flow rate through the discharge passageway is restricted relative to the combined input flow capacity to the segregated compartments inherently will be controlling at an elevation below this critical point inasmuch as it is the existence of this mechanism that creates the critical point. And, the configuration of this mechanism will affect the elevation at which this critical point is created. It is also to be emphasized that the cross sectional geometry of the discharge passageway is not critical so long as the geometry is uniform down to an elevation below the critical point. And, in fact, a change in cross sectional geometry below the discharge passageway may be employed to create the mechanism to impart flow rate limitation above.

The maximum height at which this critical point of non-uniform flow could be located under the worst conditions can easily be determined in the following manner. A discharge tube having the desired cross sectional area is positioned such that its longitudinal axis is vertical. A plate is positioned to close off its open lower end and the tube is filled with the particulate solid material that is to be blended. The closure plate is then shifted to open a chordal segment of narrow width sufficient to permit the solid particulate material to gravitate downwardly and out through the segment opening in a free flowing manner. The point above the lower end of the tube at which the particles vertically above the segment opening begin to gravitate downwardly more rapidly than other particles in the same cross section layer is the aforementioned critical point for that tube and that particulate solid material. If the discharge tube length is greater than the critical distance between that point and the lower end of the tube, the flow rate across the entry section of the discharge tube will be uniform and independent of the upstream parameters. It has been observed that this critical point is reached at an elevation equal to about 1–2 tube diameters for dry wheat within a smooth-walled cylindrical tube. Under more ideal conditions, as where the discharge tube outlet occupies substantially the full cross sectional area of the tube, the critical point can be expected to exist below that point determined by the above-described test.

The length of the entry section of the discharge tube is critical only to the extent that it must be sufficiently long to enable the solid material to enter the entry section under turbulent conditions, undergo a transition to substantially laminar flow, and exit the entry section under laminar flow conditions. For practical purposes, the outlet to the entry section should be above the aforementioned critical point. In the expected case, the solid particulate material would enter the discharge tube entry section in a plurality of streams each being fed from a continuously-replenished overhead body of segregated material within the main section of the blender means of large cross sectional area, and thus the material will not enter the entry section under laminar flow conditions. However, by being confined in segregated streams, each of uniform cross section longitudinally (as occurs in the entry section), the material within each stream will assume laminar flow conditions within a very short distance. Upon reaching laminar flow conditions, the multiple streams can be recombined without material transfer from one stream to another by termination of the divider plate (delineating the exit to the discharge passageway inlet section).

The feeder cannot influence grain body flow through the bin because of the inherent operating characteristics of the blender. Consequently, automatic moisture and heat addition control equipment which does not sense the actual wheat flow rate can be employed without risk of over or under-reaction resulting from variable flow rates. Use of this type of control equipment reduces the capital cost of the system.

Returning to FIG. 1a, a preferred control system is shown for automatically regulating the bulgurizing of wheat on a continuous basis. Firstly, the wheat enters the system from a source of supply indicated as a supply bin S that feeds a clock-controlled dump scale DS. The dump scale empties a pre-determined weight of wheat into a continuous output feed bin F on a timed periodic basis. The output from bin F is controlled by a variable flow restrictor such as a pinch valve 19 operated by a regulating means 21 in response to the sensed mass of material within bin F as sensed by level sensor 23. The continuous output from bin F is conveyed by means C to washer 1.

The setting of the periodic dumping rate and quantity of the dump scale determines the wheat throughput of the process. Regulatory means 21 is set to control the output rate of bin F such that the average sensed level within bin F will remain a constant; that is to say, regulator means 21 is designed to average the changing level in bin F caused by the periodic wheat input from dump scale DS so that the fluctuating level in bin F will not affect the setting of pinch valve 19 unless the gross average output through valve 19 does not match the gross average input to bin F. This combination of a periodic dump scale DS feeding into a continuous output bin F with the output therefrom sensitive only to average changes within bin F provides simultaneously for accurate weighing of wheat introduced to the process and for a continuous wheat flow without the expensive and complicated continuous, weight-integrating conveying equipment heretofore employed.

In order for the level sensor 23 to provide an accurate indication of the wheat level within bin F, the upper surface of the wheat body must maintain a uniform profile. Wheat discharge means 25, substantially similar to means 3 and 9 heretofore described in structure and function, is provided in the bottom of bin F to ensure that a uniform upper surface profile will exist. In the arrangement shown in FIG. 1a, the upper surface profile 27 will be that of an inverted cone with the sloping surface being determined by the angle or repose of the wheat dumped from dump scale DS.

If other mass sensing means are employed, such as load cells mounted to bin F so as to sense changes in the weight of the wheat body therein, the maintenance of a constant upper surface profile would not be necessary. However, the provision of means 25 would still be desirable to provide for last in-last out discharge of wheat from bin F.

Control means similar to means 21–23 are employed with each penetration bin 4, 8 to regulate the discharge rate of each pinch valve 5 and 7. In the case of penetration bin 4, pinch valve 5 is operated by a regulating means 13 in response to the sensed mass of material with bin 4 as sensed by level sensor 13a. Regulating means 13 is set to control the output rate of bin 4 such that the average sensed level within bin 4 will remain a constant. Likewise, regulating means 17 and level senser 17a control the output rate through pinch valve 7 in proportion to the sensed level within bin 8. The provision of means 3 and 4 in bins 4 and 8, respectively, results in the upper surface profile in each bin to remain a constant, as described above in reference to means 25 and bin F, to enable the level sensors to accurately indicate the respective bin level.

Upper limit regulating means 11 and 15 are provided to halt infeed conveyor operation in the event that the level within the respective bins rises above a predetermined maximum level. Approximate means would also be employed to halt the operation of the conveying mechanisms C and 1 in the event that means 11 sensed an overlevel condition within bin 4.

Figure 1C:
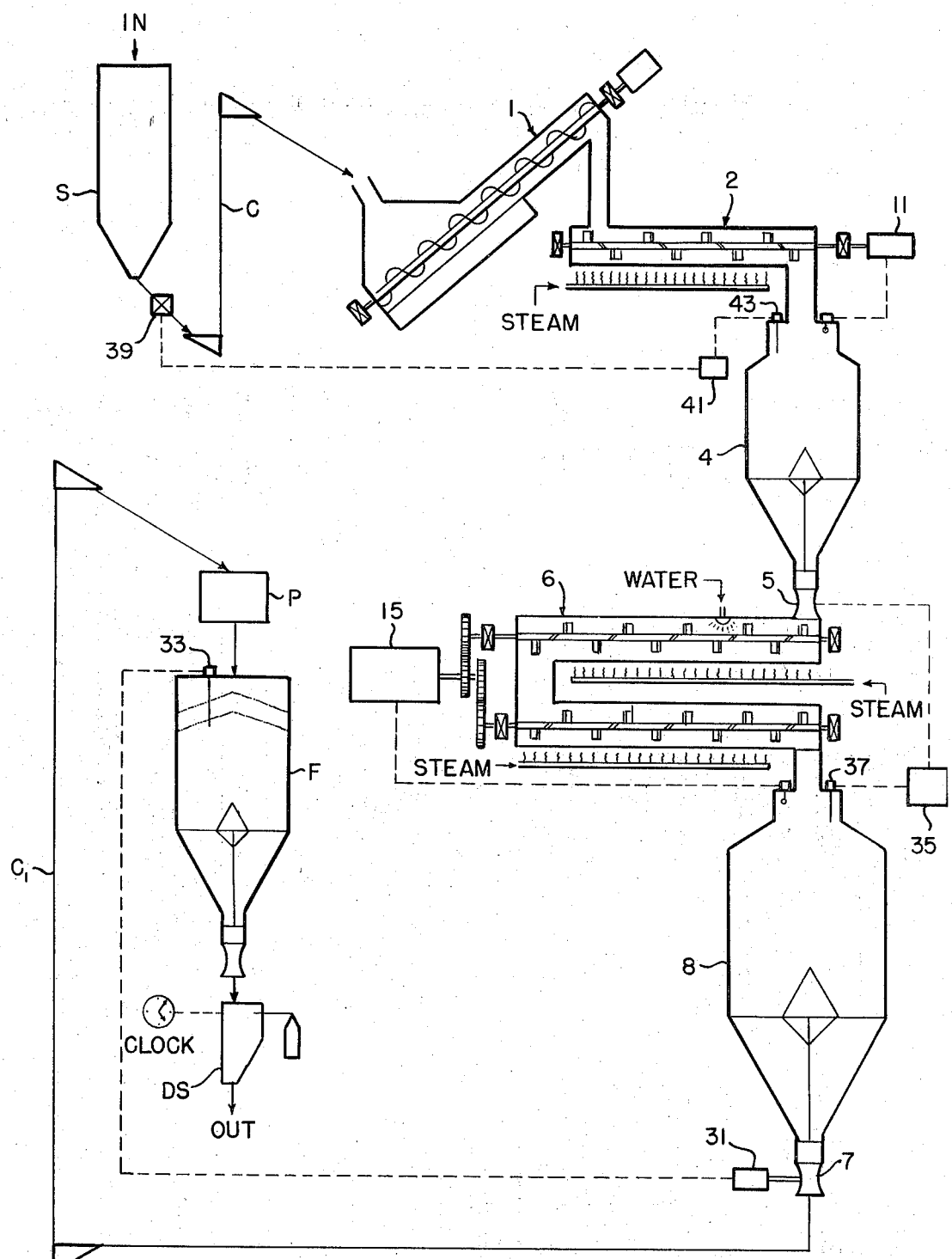
FIG. 1c is another schematic flow diagram of a two-stage embodiment of the process of this invention.

If it is desired to control the bulgur process from the output end rather than from the input end depicted in FIG. 1a, the control system of FIG. 1c and could be employed. In FIG. 1c, wheat enters the system from a source of supply indicated as a supply bin S and is conveyed by conveyor C to washer 1. The wheat passes through a series of two moisture and heat addition and penetration zones (2–4 and 6–8, respectively) to undergo gelatinization in the manner described hereinabove. From penetration zone 8, the gelatinized wheat is passed, as by conveyor $C_1$, to the final stages of bulgur processing P for drying and pearling prior to storage. Prior to leaving the system, the finished product is passed to feed bin F which empties into a clock-controlled dump scale DS.

The dump scale DS discharges a predetermined weight of product to storage for example on a timed periodic basis. Bin F will periodically refill dump scale DS and therefore will contain a fluctuating amount of material. The process upstream of bin F is continuous and therefore the amount of material added to bin F from the process must be proportioned to the intermittent filling and emptying of dump scale DS. As shown in FIG. 1c, this is accomplished by regulating the bulgur output through pinch valve 7 by a regulating means 31 in response to the sensed mass of material within bin F as sensed by level sensor 33. Regulating means 31 is set to control the output rate of bin 8 such that the average sensed level within bin F will remain a constant; that is to say, regulating means 31 is designed to average the changing level in bin F caused by the periodic filling of dump scale DS so that the fluctuating level in bin F will not affect the setting of pinch valve 7 unless the gross average output through valve 7 does not match the gross average discharge from dump scale DS.

Likewise, pinch valve 5 is operated by regulating means 35 in response to the sensed level of wheat within bin 8 as sensed by level sensor 37. And flow control means 39 is operated to regulate the output from supply bin S by regulating means 41 in response to the sensed level of wheat within bin 4 as sensed by level sensor 43.

The FIG. 1c control system provides an intermittent output from a continuous process in such a manner that the output product can be weighed precisely without utilizing expensive and complicated continuous, weight-integratnig conveying equipment.

The principles of FIGS. 1a and 1c could be combined in one continuous process if desired. For example, clean dry wheat could be pre-tempered by being continuously passed through a series of moisture addition and moisture penetration zones to a feed bin feeding a clock-controlled dump scale. This portion of the wheat process, the pretempering portion, would be controlled in the manner described in FIG. 1c; that is to say, the output of an upstream zone would be controlled to equalize the average withdrawal from a downstream zone in such a manner that the upstream zone output will remain a constant as long as the gross average withdrawal from the downstream zone remain constant. The pretempered wheat empties from the dumpscale into another feed bin feeding into the bulgur process as depicted in FIG. 1a. In the combination of the concepts of FIGS. 1a and 1c as just described, an equalizing feed bin is provided immediately upstream and downstream of the clock-controlled dump scale to compensate for the placement of the intermittent dump scale operation in the midst of the overall continuous processing of wheat into bulgur.

By utilizing the concepts of FIGS. 1a and 1c, most grain milling processes can be performed in a continuous manner with accurate dump scale weighings being taken where appropriate. By regulating an overall continuous process by the periodic weighing of the material being processed, and by employing intermediate process zone-to-zone regulation in proportion to the periodic dump scale operation, material can be added to or taken from the process without disrupting the overall system, and the processed material itself can after volumetrically or gravimetrically without disrupting the overall system.

It is believed that the invention will have been clearly understod from the foregoing detailed description of our now-preferred illustrated embodiment. Changes in the details of construction may be resorted to without departing from the spirit of the invention and it is accordingly our invention that no limitations be implied and that the hereto annexed claims be given the broadest interpretation to which the employed language fairly admits. For example, the concept of a continuous process for adding heat and moisture described herein may be employed for other cereal grains, such as the partial gelatinization of rice where it is desired to attain uniform heat and moisture penetration, or the pretempering of wheat where it is desired to uniformly raise moisture content. Furthermore, the continuous process control concepts described herein may be employed to regulate the continuous processing of a variety of particulate materials where bin storage is required on a last-in-last-out basis, where bin storage of blended materials is required without separation caused by nonuniform "daw down" of the bin, or where the accuracy and simplicity of batch-type material weighing is desired in an otherwise continuous processing of the material.

The embodiments of the invention in which an exclusive property or privilege is claimed are defined as follows:

1. A continuous method of processing wheat to produce bulgur consisting essentially of the steps of continuously conveying a body of wheat through a first zone of moisture and heat addition to a vertically-elongated second zone; simultaneously adding moisture and heat to the wheat body in said first zone to raise the wheat berry moisture and temperature to predetermined levels of 20–35 wt. percent and 160°–205° F., respectively, causing the wheat body to uniformly traverse downwardly through said second zone for a period sufficient to enable the moisture added in said first zone to substantially uniformly penetrate the wheat berry, and to discharge from said second zone at a controlled rate; and thereafter continuously conveying said wheat body through at least one additional zone of moisture and heat addition to an additional vertically-elongated zone, said simultaneously adding moisture and heat to said wheat body in said additional zone of moisture and heat addition until the wheat berry attains a gelatinizable moisture and temperature level of at least 40 wt. percent and 195–210° F., respectively, and causing said wheat body to uniformly traverse downwardly through the additional vertically-elongated zone for a period sufficient to enable the moisture added in the additional zone of moisture and heat addition to substantially uniformly penetrate the wheat berry and to enable said wheat body to substantially completely gelatinize, and to discharge from such additional vertically-elongated zone at a controlled rate substantially completely gelatinized.

2. The method of claim 1 wherein said wheat body is caused to uniformly traverse each vertically-elongated zone by dividing said wheat body into a plurality of physically-separated streams, directing each such physically-separated stream into an elongated discharge passageway, recombining the streams within the discharge passageway, and causing the recombined streams to uniformly traverse and discharge passageway at a restricted rate under the influence of gravity and independent of flow conditions upstream of the discharge passageway.

3. The method of claim 1 wherein said wheat body is caused to uniformly traverse each vertically-elongated zone by dividing said wheat body into a plurality of physically-separated streams in the lower end portion of each such zone, directing each such physically-separated stream into an elongated discharge passageway, recombining the streams within the discharge passageway, and causing the recombined streams to uniformly traverse the discharge passageway at a restricted flow rate under the influenece of gravity and independent of flow conditions upstream of the discharge passageway.

4. A continuous method of processing wheat to produce bulgur consisting essentially of the steps of continuously conveying a body of wheat through a first zone of moisture and heat addition to a vertically-elongated second zone; simultaneously adding moisture and heat to the wheat body in said first zone to raise the wheat berry moisture and temperature to between about 20 wt. percent–35 wt. percent and 160° F.–205° F., respectively, causing the wheat body to uniformly traverse downwardly through said second zone for a period sufficient to enable the moisture added in said first zone to substantially uniformly penetrate the wheat berry, and to discharge from the second zone at a controlled rate; continuously conveying said wheat body through a third zone of moisture and heat addition to a vertically-elongated fourth zone; simultaneously adding moisture and heat to the wheat body in said third zone to raise the wheat berry moisture and temperature to between about 30 wt. percent–45 wt. percent and 185° F.–210° F., respectively; causing the wheat body to uniformly traverse downwardly through said fourth zone for a period sufficient to enable the moisture added in said third zone to substantially uniformly penetrate the wheat berry, and to discharge from said fourth zone at a controlled rate; continuously conveying said wheat body through a fifth zone of moisture and heat addition to a vertically-elongated sixth zone; simultaneously adding moisture and heat to the wheat body in said fifth zone to raise the wheat berry moisture and temperature to between about 40 wt. percent–45 wt. percent and 204° F.–210° F., respectively; causing the wheat body to uniformly traverse downwardly through said sixth zone for a period sufficient to enable the moisture added in said fifth zone to substantially uniformly penetrate the wheat berry and to enable the wheat body to substantially completely gelatinize, and to discharge from said sixth zone at a controlled rate substantially completely gelatinized.

5. The method of claim 4 wherein said wheat body is caused to uniformly traverse each vertically-elongated zone by dividing said wheat body into a plurality of physically-separated streams, directing each such physically-separated stream into an elongated discharge passageway, recombining the streams within the discharge passageway, and causing the recombined streams to uniformly traverse the discharge passageway at a restricted rate under the influence of gravity and independent of flow conditions upstream of the discharge passageway.

6. The method of claim 4 wherein said wheat body is caused to uniformly traverse each vertically-elongated zone by dividing said wheat body into a plurality of physically-separated streams in the lower end portion of each such zone, directing each such physically-separated stream into an elongated discharge passageway, recombining the streams within the discharge passageway, and causing the recombined streams to uniformly traverse the discharge passageway at a restricted flow rate under the influence of gravity and independent of flow conditions upstream of the discharge passageway.

7. A continuous method of processing wheat to produce bulgur consisting essentially of the steps of continuously conveying a body of wheat through a first zone of moisture and heat addition to a vertically-elongated second zone; simultaneously adding moisture and heat to the wheat body in said first zone to raise the wheat berry moisture and temperature to about 30 wt. percent and 195° F., respectively, causing the wheat body to uniformly traverse downwardly through said second zone for a period sufficient to enable the moisture added in said first zone to substantially uniformly penetrate the wheat berry, and to discharge from the second zone at a controlled rate; continuously conveying said wheat body to a third zone of moisture and heat addition to a vertically-elongated fourth zone; simultaneously adding moisture and heat to the wheat body in said third zone to raise the wheat berry moisture and temperature to about 42 wt. percent and 205° F.–210° F., respectively, causing the wheat body to uniformly traverse downwardly through said fourth zone for a period sufficient to enable the moisture added in said third zone to substantially uniformly penetrate the wheat berry and to enable the wheat body to substantially completely gelatinize, and to discharge from said fourth zone at a controlled rate substantially completely gelatinized.

8. The method of claim 7 wherein said wheat body is caused to uniformly traverse each vertically-elongated zone by dividing said wheat body into a plurality of physically-separated streams, directing each such physically-separated stream into an elongated discharge passageway, recombining the streams within the discharge passageway, and causing the recombined streams to uniformly traverse the discharge passageway at a restricted rate under the influence of gravity and independent of flow conditions upstream of the discharge passageway.

9. The method of claim 7 wherein said wheat body is caused to uniformly traverse each vertically-elongated zone by dividing said wheat body into a plurality of physically-separated streams in the lower end portion of each such zone, directing each such physical-separated stream into an elongated discharge passageway, recombining the streams within the discharge passageway, and causing the recombined streams to uniformly traverse the discharge passageway at a restricted flow rate under the influence of gravity and independent of flow conditions upstream of the discharge passageway.

10. The method of claim 7 wherein said wheat body is caused to uniformly traverse said second zone in a period equal to about 30% of the total time required to traverse both said second zone and said fourth zone; and wherein said wheat body is caused to uniformly traverse said fourth zone in a period equal to about 70% of the time required to traverse both said second zone and said fourth zone.

11. A system for processing wheat to produce bulgur consisting essentially of first means for continuously conveying a body of wheat through a first zone of moisture and heat addition; second means for spraying wheat conveyed by said first means with water and steam to provide the wheat with a predetermined moisture and heat content; a first vertically-elongated bin adapted to receive wheat at an upper end from said first means and to discharge wheat at a lower end; third means for controlling wheat discharge from said first bin to cause wheat to uniformly traverse said first bin over a time period sufficient to enable the moisture added by said second means to substantially uniformly penetrate the wheat berry; and at least one additional means for continuously conveying the wheat body through at least one additional zone of moisture and heat addition, and at least one additional means for spraying wheat with water and steam to provide the wheat with a moisture and heat content of at least 40 wt. percent and 195° F.–210° F., respectively, and at least one additional vertically-elongated bin adapted to receive wheat from the additional conveying means and to discharge wheat at a lower end, and at least one additional means for controlling wheat discharge from the additional bin to cause wheat to uniformly traverse the additional bin over a time period sufficient to enable the moisture added by the additional water and steam addition means to substantially uniformly penetrate the wheat berry and to enable the wheat body to substantially gelatinize.

12. The system of claim 11 wherein each of the means for conveying wheat through a moisture and heat addition zone includes foraminous means enabling excess water and steam to dissipate such that no wheat immersion occurs.

13. The system of claim 11 wherein each means for controlling wheat discharge from a respective bin includes sensing means and response means operably coupled to the wheat discharge control means and the respective bin to maintain the wheat body level in such bin above a predetermined point.

14. The system of claim 11 wherein each of the means for controlling wheat discharge from a bin comprises a discharge passageway, means providing a plurality of segregated compartments extending into and terminating open-ended within an entry section of the discharge passageway, inlet means communicating with a lower portion of the respective bin and providing an inlet into each comprtment, and means effecting a flow rate limitation in the discharge passageway.

15. The system of claim 14 wherein each of the means for controlling wheat discharge is incorporated into the bottom section of the respective bin.

16. A continuous method of processing wheat to produce bulgur consisting essentially of the steps of providing a supply of wheat; intermittently introducing predetermined amounts of wheat from said supply to a first storage zone; continuously withdrawing wheat from said first storage zone at a rate proportional to the average amount of wheat introduced to said first storage zone; passing such wheat through at least one series of moisture and heat addition and penetration zones wherein firstly moisture and heat are added to the wheat body as it passes through a moisture and heat addition zone, and secondly the wheat body is caused to uniformly traverse a penetration zone whereby the wheat body leaves said series with the wheat berry starches substantially completely gelatinized with a moisture and heat content of at least 40 wt. percent and 195° F.–210° F., respectively; and controlling the rate of wheat withdrawal from each penetration zone to maintain such rates in predetermined proportions with the withdrawal rate from said first storage zone.

17. The method of claim 16 wherein the wheat body is caused to uniformly traverse each penetration zone by withdrawing the wheat body from each penetration zone in a plurality of physically-separated streams, directing the separated streams into an elongated discharge passageway and recombining them into one stream within the discharge passageway at a flow rate less than the combined flow capacity of the separated streams and under laminar flow conditions such that at the terminus of the separated streams the wheat traverses the discharge passageway at a rate that is uniform across the passageway thereby causing the wheat body to enter each separated stream in proportion to the respective cross sectional areas of the separated streams at their terminus.

18. A continuous method of processing wheat to produce bulgur consisting essentially of the steps of providing a supply of wheat; continuously withdrawing wheat from said supply and passing such wheat through at least one series of moisture and heat addition and penetration zones wherein firstly moisture and heat are added to the wheat body as it passes through a moisture and heat addition zone, and secondly the wheat body is caused to uniformly traverse a penetration zone whereby the wheat body leaves said series with the wheat berry starches substantially completely gelatinized with a moisture and heat content of at least 40 wt. percent and 195° F.–210° F., respectively; passing the gelatinized wheat to a processing zone wherein such wheat is dried; passing the dried wheat to a storage zone; intermittently withdrawing predetermined amounts of wheat from said storage zone; controlling the rate of wheat introduction to said storage zone to maintain such rate proportional to the average amount of wheat withdrawn from said storage zone; and controlling the rate of wheat withdrawal from each penetration zone to maintain such rates in predetermined proportions with the introduction rate to said storage zone.

19. The method of claim 18 wherein the wheat body is caused to uniformly traverse each penetration zone by withdrawing the wheat body from each penetration zone in a plurality of physically-separated streams, directing the separated streams into an elongated discharge passageway at a flow rate less than the combined flow capacity of the separated streams and under laminar flow conditions such that at the terminus of the separated streams the wheat traverses the discharge passageway at a rate that is uniform across the passageway thereby causing the wheat body to enter each separated stream in proportion to the respective cross sectional areas of the separated streams at their terminus.

20. A continuous method of processing wheat to produce bulgur consisting essentially of the steps of providing a supply of wheat; continuously withdrawing wheat from said supply and passing such wheat through at least one series of moisture addition and penetration zones wherein firstly moisture is added to the wheat body as it passes through a moisture addition zone, and secondly the wheat body is caused to uniformly traverse a penetration zone whereby the wheat body leaves said series in a desired pretempered condition; passing the pretempered wheat from the last pretempering penetration zone to a first storage zone; intermittently withdrawing predetermined amounts of pretempered wheat from said first storage zone, controlling the rate of wheat introduction to said first storage zone to maintain such rate proportional to the average amount of wheat withdrawn from said first storage zone; controlling the rate of wheat withdrawal from each penetration zone to maintain such rates in predetermined proportions with the introduction rate to said first storage zone; introducing the intermittently withdrawn and predetermined amounts of pretempered wheat to a second storage zone; continuously withdrawing wheat from said second storage zone at a rate proportional to the average amount of wheat introduced to said second storage zone; passing such wheat through at least one series of moisture and heat addition and penetration zones wherein firstly moisture and heat are added to the wheat body as it passes through a moisture and heat addition zone; and secondly the wheat body is caused to uniformly traverse a penetration zone whereby the wheat body leaves said series with the wheat berry starches substantially completely gelatinized; and controlling the rate of wheat withdrawal from each penetration zone to maintain such rates in predetermined proportions with the withdrawal rate from said second storage zone.

21. The method of claim 20 wherein the wheat body is caused to uniformly traverse each penetration zone by withdrawing the wheat body from each penetration zone in a plurality of physically-separated streams, directing the separated streams into an elongated discharge passageway and recombining them into one stream within the discharge passageway at a flow rate less than the combined flow capacity of the separated streams and under laminar flow conditions such that at the terminus of the separated streams the wheat traverses the discharge passageway at a rate that is uniform across the passageway thereby causing the wheat body to enter each separated stream in proportion to the respective cross sectional areas of the separated streams at their terminus.

References Cited

UNITED STATES PATENTS

| | | | |
|---|---|---|---|
| 2,884,327 | 4/1959 | Robbins | 99—80 PS |
| 3,132,948 | 5/1964 | Smith et al. | 99—80 PS |
| 2,498,573 | 2/1950 | Ozai-Durrani | 99—237 R |
| 3,457,084 | 7/1969 | Weiss | 99—80 PS |

RAYMOND N. JONES, Primary Examiner

U.S. Cl. X.R.

99—516